United States Patent
Viswanathan

(10) Patent No.: US 9,438,335 B2
(45) Date of Patent: Sep. 6, 2016

(54) OPTICAL FIBER DEFECT DETECTION

(71) Applicant: Texas Instruments Incorporated, Dallas, TX (US)

(72) Inventor: Nagarajan Viswanathan, Karnataka (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 14/579,380

(22) Filed: Dec. 22, 2014

(65) Prior Publication Data

US 2015/0188626 A1    Jul. 2, 2015

Related U.S. Application Data

(63) Continuation of application No. 61/920,814, filed on Dec. 26, 2013.

(51) Int. Cl.
*H04B 10/08* (2006.01)
*H04B 10/071* (2013.01)
*G01M 11/00* (2006.01)

(52) U.S. Cl.
CPC ........ *H04B 10/071* (2013.01); *G01M 11/3109* (2013.01)

(58) Field of Classification Search
CPC ............ H04B 10/071; H04B 10/0771; H04B 10/0791
See application file for complete search history.

(56) References Cited

U.S. PATENT DOCUMENTS

| | | | | |
|---|---|---|---|---|
| 6,075,628 | A * | 6/2000 | Fisher | G01M 11/3118 398/1 |
| 2010/0290035 | A1* | 11/2010 | Wang | G01M 11/3118 356/73.1 |
| 2013/0077975 | A1* | 3/2013 | Dvir | H04B 10/071 398/66 |
| 2013/0251363 | A1* | 9/2013 | Joffe | H04B 10/071 398/28 |

* cited by examiner

*Primary Examiner* — Dzung Tran
(74) *Attorney, Agent, or Firm* — Gregory J. Albin; Frank D. Cimino

(57) ABSTRACT

An optical data transmitter is operable to transmit data other than test data on an optical fiber at a first wavelength and an optical time domain reflectometer is operable to receive data from the optical fiber at the first wavelength and to use the received data at the first wavelength to determine whether a defect exists in the optical fiber.

20 Claims, 3 Drawing Sheets

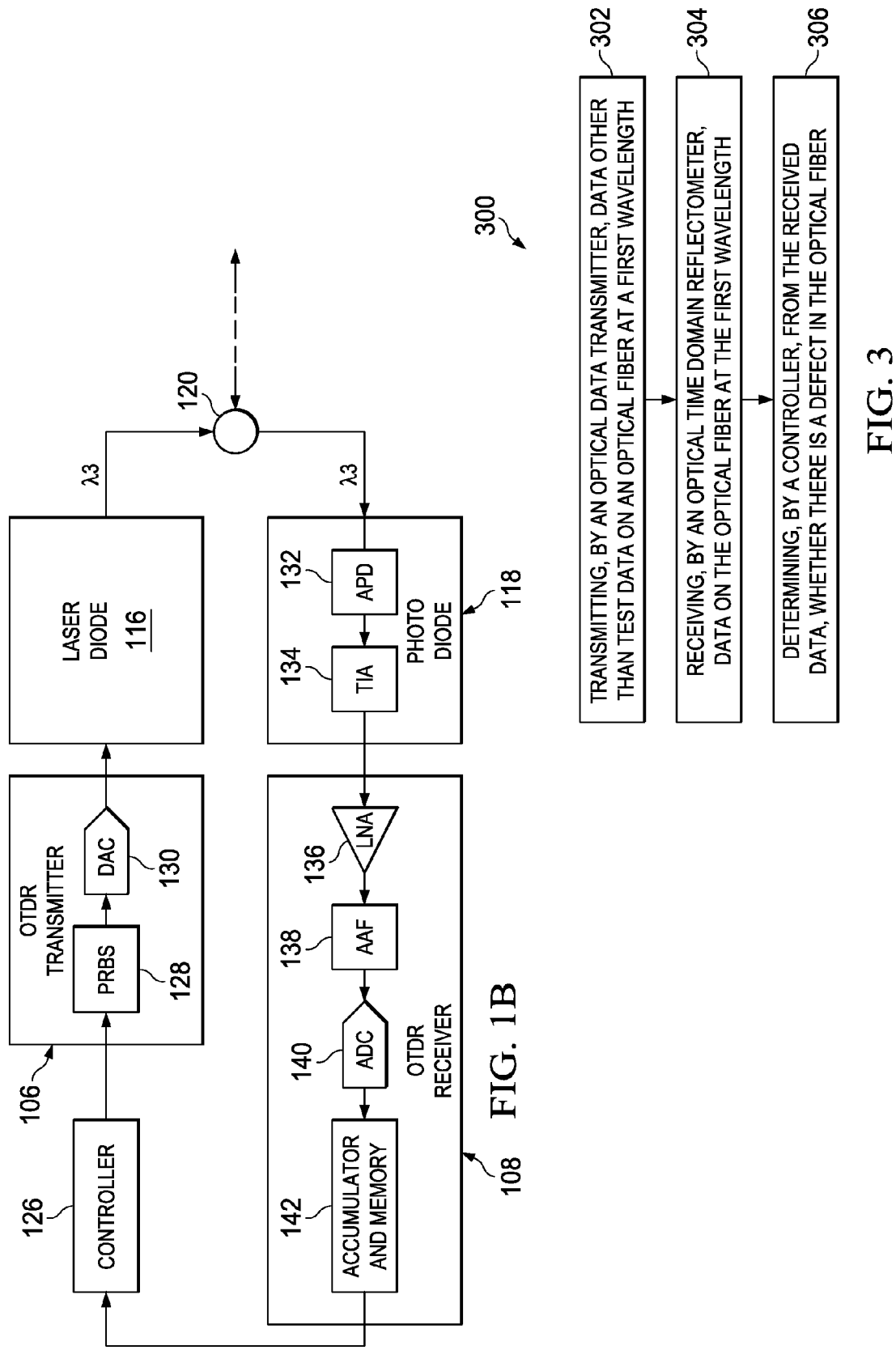

US 9,438,335 B2

OPTICAL FIBER DEFECT DETECTION

This application claims the benefit of U.S. Provisional Application No. 61/920,814 filed Dec. 26, 2013, entitled "OTDR SYSTEM FOR OPTICAL COMMUNICATION SYSTEM USING TRANSMITTER DATA", which is hereby incorporated by reference except for claim 2.

BACKGROUND

Optical fibers are commonly used for high speed communications. In order to ensure reliable communication, it is important to be able to detect defects or faults in a fiber optic cable, for example, breaks or sharp bends, or defects caused by splicing or connectors, and so forth. It is common to use an Optical Time Domain Reflectometer (OTDR) to detect such defects. Typically, for an OTDR, a Pseudo-Random Binary Sequence (PRBS) is transmitted and any reflected signals are observed. The strength and delay of a reflected signal is used to determine the type and location of a defect.

A separate OTDR may be attached for defect detection when a fiber optic cable is not being used for communication. Alternatively, OTDR functionality may be included in a fiber optic communication system to enable simultaneous defect detection and communication. Typically, multiple optical signals are simultaneously transmitted along a fiber optic cable, with each optical signal using a different wavelength of light. The method is called Wavelength Division Multiplexing (WDM). Using separate wavelengths for each optical signal minimizes interference between optical signals. To simplify discussion, assume a first optical signal is transmitted along an optical fiber cable in a first direction at a first wavelength, and simultaneously a second optical signal is transmitted in the opposite direction along the fiber optic cable using a second wavelength. In the example simplified system, OTDR functionality typically operates at a third wavelength to minimize interference with the two optical data communication signals.

FIG. 1A illustrates a simplified example of a prior art optical fiber communication system 100 with integrated OTDR. The example system 100 includes a data transmitter 102, a data receiver 104, an OTDR transmitter 106, and an OTDR receiver 108. The data transmitter 102 transmits optical signals at a first wavelength $\lambda 1$ using a laser diode 110. The data receiver 104 detects optical signals at a second wavelength $\lambda 2$ using a photo diode 112. The OTDR transmitter 106 transmits optical signals at a third wavelength $\lambda 3$ using a laser diode 116. The OTDR receiver 108 detects optical signals at the third wavelength $\lambda 3$ using a photo diode 118. The transmitted and received data signals are combined using a WDM coupler 114. The transmitted and received OTDR signals are combined using a coupler 120. All data signals and OTDR signals pass through a coupler 122 for simultaneous transmission and reception along an optical fiber 124. A controller 126 analyzes the received OTDR information to determine whether there are defects and to determine the location of any defects.

FIG. 1B illustrates additional example detail for the OTDR portions of the simplified example system of FIG. 1A. In FIG. 1B, the OTDR transmitter 106 further comprises a PRBS burst generator 128 and a Digital-To-Analog Converter (DAC) 130. The receiving photo diode 118 further comprises an Avalanche Photodiode (APD) 132 and a Trans-Impedance Amplifier (TIA) 134. The OTDR receiver 108 further comprises a Low-Noise Amplifier (LNA) 136 followed by an Anti-Aliasing Filter (AAF) 138, an Analog-To-Digital Converter (ADC) 140, and a data accumulator and memory 142.

BRIEF DESCRIPTION OF THE DRAWINGS

FIG. 1B is a block diagram illustrating example additional detail for part of the system of FIG. 1A.

FIG. 3 is a flow chart illustrating an example method for detecting defects in an optical fiber.

DETAILED DESCRIPTION

Figure 1A:
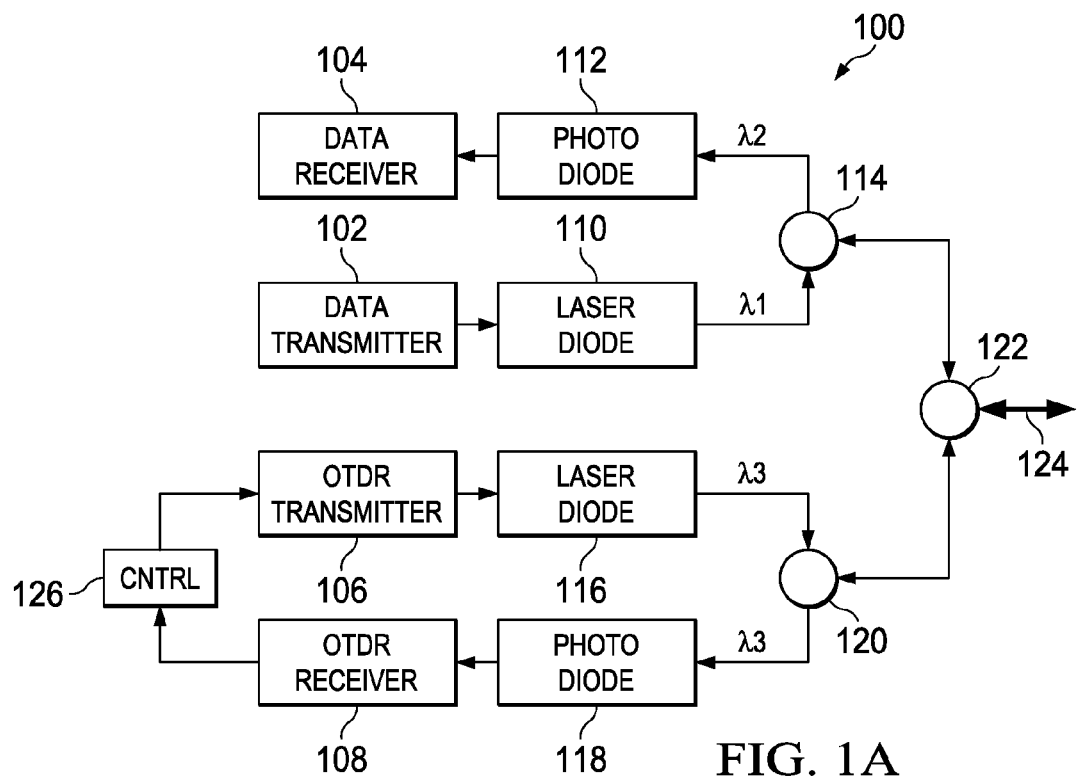
FIG. 1A is a simplified block diagram illustrating an example prior art optical fiber communication system.

The system illustrated in FIGS. 1A and 1B has several disadvantages. First, the OTDR transmitter 106 and its associated circuitry add cost and circuit area. Second, the characteristics of the optical fiber change with wavelength and the characteristics being measured by the OTDR system are not at the wavelength of the data. For example, a typical data communication speed may be on the order of 10 giga-bits-per-second, whereas a typical OTDR transmitter and receiver may operate on the order of 10 MHz. Third, for cost purposes, the OTDR receiving amplifier 136 may be a standard part that is identical to a corresponding receiving amplifier in the data receiver 104. If so, the linearity of the OTDR receiving amplifier 136 may be optimized for the data wavelengths ($\lambda 1$, $\lambda 2$) and may be less linear at the OTDR wavelength ($\lambda 3$). Nonlinearity of the OTDR receiving amplifier 136 at the OTDR wavelength ($\lambda 3$) degrades the accuracy of the resulting OTDR measurements. There is a need for lower cost and improved accuracy for optical fiber defect detection.

Figure 2A:
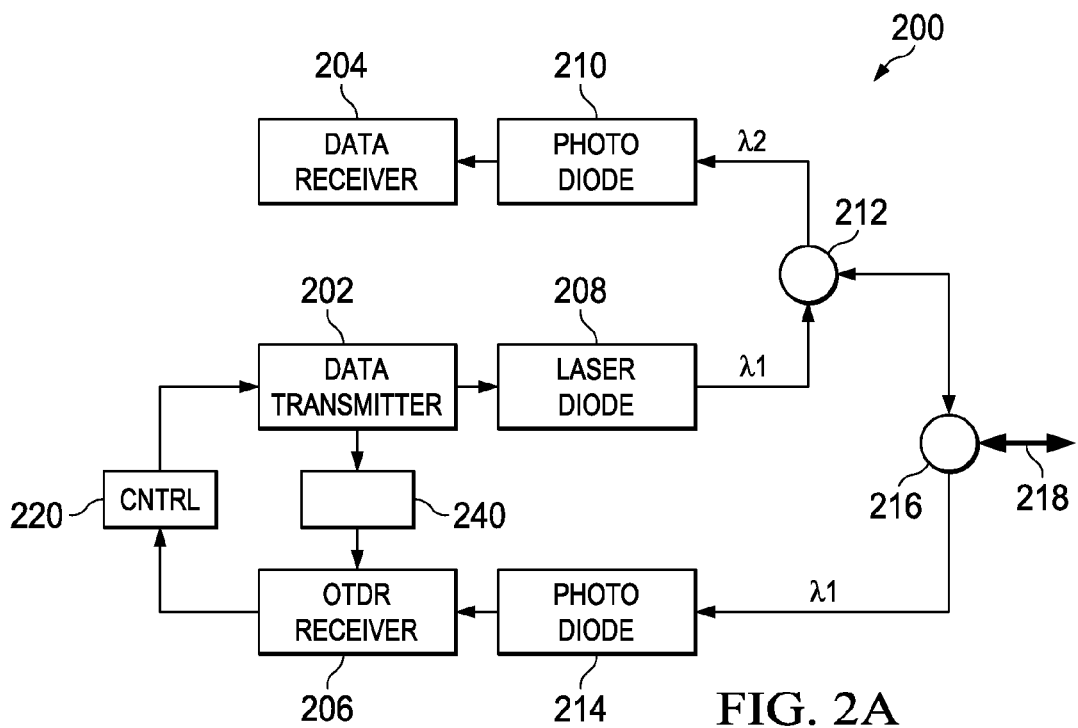
FIG. 2A is a block diagram illustrating an example embodiment of an improved optical fiber communication system.

FIG. 2A is a block diagram illustrating an example embodiment of an improved optical fiber communication system 200. The example system 200 includes a data transmitter 202, a data receiver 204, and an OTDR receiver 206. The data transmitter 202 transmits optical signals at a first wavelength $\lambda 1$ using a laser diode 208. The data receiver 204 detects optical signals at a second wavelength $\lambda 2$ using a photo diode 210. The OTDR receiver 206 detects optical signals at the first wavelength $\lambda 1$ using a photo diode 214. The transmitted and received data signals are combined using a WDM coupler 212. All data signals and OTDR signals pass through a coupler 216 for simultaneous transmission and reception along an optical fiber 218. A controller 220 analyzes the received OTDR information to determine whether there are defects and to determine the location of any defects.

Figure 2B:
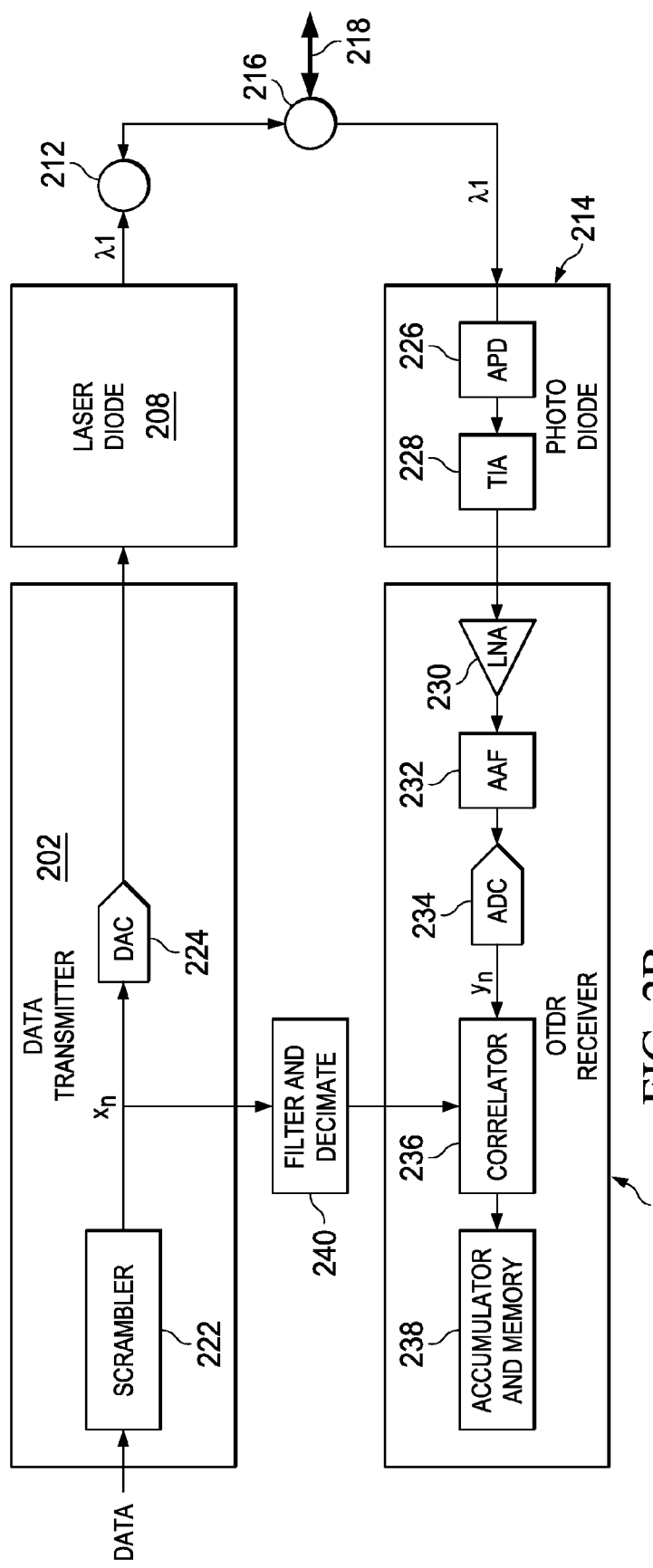
FIG. 2B is a block diagram illustrating example additional detail for part of the system of FIG. 2A.

FIG. 2B illustrates additional example detail for the data transmitter and OTDR portions of the simplified example system of FIG. 2A. In FIG. 2B, the data transmitter 202 further comprises a scrambler 22 and a DAC 224. The OTDR comprises an OTDR receiver 206, a controller 220, and a filter/decimator 240. A receiving photo diode 214 further comprises an APD 226 and a TIA 228. The OTDR receiver 206 comprises a LNA 230 followed by an AAF 232, an ADC 234, a correlator 236, and an accumulator and memory 238. Scrambled data from the output of the scrambler 222 is filtered and decimated (240) before being cross-correlated (236) with the output of the ADC 234, which will be explained in more detail below.

Comparing the example system 200 in FIGS. 2A and 2B to the prior art system 100 in FIGS. 1A and 1B, note the following differences. First, the example system 200 uses data from the data transmitter 202 for OTDR instead of using a separate PRBS system (FIG. 1B, 128) thereby eliminating one transmission system, which reduces cost and circuit area. Second, it is important to characterize the optical fiber at a data wavelength and since the example system 200 uses data from the data transmitter 202 for OTDR, the OTDR receiver 206 operates at a data wavelength (λ1). Having the OTDR receiver operate at a data wavelength also enables use of a receiving amplifier 230 optimized for linearity at the wavelength of the OTDR signal, thereby improving the accuracy of defect measurement. Third, as discussed in more detail below, the example system 200 reduces both noise and linearity effects by averaging.

In a typical optical communication system as in the example system 100 in FIGS. 1A and 1B, blocks of PRBS data used for OTDR are repetitive and multiple blocks of received OTDR data are averaged. The averaged result is then cross-correlated with the PRBS data. Averaging the received data signals reduces noise but does not average the linearity effects of the optical channel and the amplifier. In contrast, in the example system 200, the transmitted data being used for OTDR is continuously varying. Since the data is continuously varying, received blocks of data cannot be averaged. Instead, in the example of system 200, each block of received data used for OTDR is cross-correlated (236) with the corresponding transmitted data and the resulting cross-correlations are averaged. For example, if there is a peak in a cross-correlation result at a particular time delay corresponding to a particular defect, that peak will occur at the particular time delay in all cross-correlation results regardless of the data being cross-correlated. The cross-correlated results include variation due to linearity of the optical channel and the amplifier. Accordingly, the results of cross-correlation are then averaged to reduce noise and to average out linearity effects of the optical channel and the amplifier.

Averaging the results of cross-correlation data can be used to relax the specifications for the linearity of the optical channel and the amplifier in the system of FIGS. 1A and 1B independent of the use of data wavelengths. That is, the system of FIGS. 1A and 1B can be improved by averaging the results of cross-correlation even if a separate OTDR transmitter 106 is used and repetitive or non-repetitive data is used.

Typically, an optical data receiver (for example, FIG. 1A, 104 or FIG. 2A, 204) extracts a clock signal from the received data. In general, long runs of one's or zero's in the data may cause a loss of clock synchronization. It is common to scramble the transmitted data (for example, FIG. 2B, 222) to reduce the probability of a long run of one's or zero's.

Typically, the bandwidth requirements for data are very different than the bandwidth requirements for OTDR. As discussed above, a typical data communication speed may be on the order of 10 giga-bits-per-second, whereas a typical OTDR transmitter and receiver may operate on the order of 10 MHz. In the example of FIG. 2B, the OTDR receiver 206 may use a low speed ADC 234, which would cause aliasing issues if it directly received high speed data. Accordingly, an anti-aliasing filter 232 is used in the OTDR receiver path to suppress aliasing before being sampled by the ADC 234.

In FIG. 2B, the output of scrambler 222 is the digital input signal x(n) to the optical fiber 218, and the output of ADC 234 is the digital received signal y(n). The digital received signal y(n) is equal to h(n)*x(n), where h(n) is the impulse response of the overall combined system (including the optical fiber 218) between x(n) and y(n), and "*" denotes convolution. The output of the correlator 236 is y(n)x(n), which is an estimate of h(n) (effectively, an estimate of the impulse response of the optical fiber 218), where "" denotes cross-correlation. It is important for x(n) and y(n) to be at the same data rate for cross-correlation, so in element 240, x(n) is filtered to prevent aliasing and then decimated to bring it to the same data rate as y(n). Decimating without filtering reduces the dynamic range of the OTDR system due to aliasing of wideband transmitter data into the processed spectrum. It can be shown that to obtain the best dynamic range of the OTDR system, the impulse response of the filter/decimator 240 needs to match the response of the anti-aliasing filter 232.

Note that cross-correlation may be computed in the time domain or in the frequency domain. That is, a discrete cross-correlation may be computed directly from the decimated x(n) data and the y(n) data, or alternatively cross-correlation may be computed from the Fourier transforms of decimated x(n) and y(n). In the frequency domain, multiplying the Fourier transform of x(n) by the Fourier transform of the complex conjugate of y(n) (or vice-versa) gives the Fourier transform of the cross-correlation of x(n) and y(n). Then, the inverse Fourier transform of the product is the cross-correlation of x(n) and y(n).

Note, for simplicity of illustration and discussion, the example systems 100 and 200 have been discussed as sending data at one wavelength and receiving data at a second wavelength. In general, optical communication systems simultaneously transmit data signals at many different wavelengths and simultaneously receive data signals at many different wavelengths. For example, the data transmitter 202 in the example system 200 may simultaneously transmit data at multiple wavelengths, and the OTDR receiver 206 may use any of the wavelengths used by the data transmitter 202.

FIG. 3 illustrates an example embodiment of a method 300 for defect detection in an optical fiber. At step 302, an optical data transmitter transmits data other than test data on an optical fiber at a first wavelength. At step 304, an optical time domain reflectometer receives data on the optical fiber at the first wavelength. At step 306, a controller determines from the received data whether there is a defect in the optical fiber.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. An optical communication system, comprising:
   an optical data transmitter operable to transmit data other than test data on an optical fiber at a first wavelength; and
   an optical time domain reflectometer operable to receive data from the optical fiber at the first wavelength, to use the received data at the first wavelength to determine whether a defect exists in the optical fiber, to cross-correlate multiple sets of the received data and transmitted data, and to average the resulting cross-correlation values.

2. The optical communication system of claim 1, where the optical data transmitter is operable to transmit data at a plurality of wavelengths in addition to the first wavelength.

3. The optical communication system of claim 1, further comprising:
the optical time domain reflectometer further comprising a correlator operable to cross-correlate the received data and the transmitted data.

4. The optical communication system of claim 3, where the cross-correlation is done in the frequency domain.

5. The optical communication system of claim 3, further comprising:
the optical time domain reflectometer further operable to average the resulting cross-correlation values.

6. The optical communication system of claim 3, further comprising:
an anti-aliasing filter that filters received data before cross-correlation.

7. The optical communication system of claim 3, further comprising:
a decimator that reduces the amount of transmitted data being cross-correlated.

8. The optical communication system of claim 7, further comprising:
an anti-aliasing filter that filters transmitted data before decimation.

9. The optical communication system of claim 1, further comprising:
a controller operable to analyze information from the optical time domain
reflector to determine whether defects exist in the optical fiber.

10. A method for defect detection in an optical fiber, comprising:
transmitting, by an optical data transmitter, data other than test data on an optical fiber at a first wavelength;
receiving, by an optical time domain reflectometer, data on the optical fiber at the first wavelength; and
cross-correlating, by a correlator, multiple sets of the received data and transmitted data; and
determining, by a controller, from the transmitted and received data, whether there is a defect in the optical fiber.

11. The method of claim 10, further comprising:
analyzing, by the controller, the results of cross-correlation to determine whether there is a defect in the optical fiber.

12. The method of claim 11, further comprising:
filtering, by an anti-aliasing filter, the received data before cross-correlating.

13. The method of claim 11, further comprising:
filtering, by an anti-aliasing filter, the transmitted data before cross-correlating.

14. The method of claim 13, further comprising:
reducing, by a decimator, the filtered transmitted data before cross-correlating.

15. An optical communication system, comprising:
an optical data transmitter operable to transmit data on an optical fiber at a particular wavelength;
an optical time domain reflectometer operable to receive data from the optical fiber at the particular wavelength;
a correlator operable to cross-correlate the received data and the transmitted data; and
the optical communication system further operable to cross-correlate multiple sets of received data and transmitted data and to average the resulting cross-correlation values.

16. The optical communication system of claim 15, further comprising:
a controller operable to analyze the average of the cross-correlations to determine whether there is a defect in the optical fiber.

17. The optical communication system of claim 15, where the particular wavelength is also used to transmit data other than test data.

18. The optical communication system of claim 17, where the particular wavelength is one of a plurality of wavelengths used to transmit data other than test data.

19. The optical communication system of claim 15, further comprising:
an anti-aliasing filter that filters transmitted data before cross-correlation; and
a decimator that reduces the amount of transmitted data being cross-correlated.

20. The optical communication system of claim 15, further comprising:
an anti-aliasing filter that filters received data before cross-correlation.

* * * * *